United States Patent [19]
Sabatino et al.

[11] 3,897,269
[45] July 29, 1975

[54] STORAGE BATTERY CONSTRUCTION AND METHOD OF MAKING SAME

[75] Inventors: Anthony Sabatino; Daniel Orlando, both of Milwaukee, Wis.

[73] Assignee: Globe-Union Inc., Milwaukee, Wis.

[22] Filed: Aug. 21, 1961

[21] Appl. No.: 132,660

[52] U.S. Cl. ............... 136/176; 136/134 R; 219/94; 219/150.5
[51] Int. Cl. ............................................ H01m 5/00
[58] Field of Search ........... 136/134, 176, 163, 168; 219/78, 93, 94, 157, 57, 58, 101, 152, 150; 148/11.5, 127, 130

[56] References Cited
UNITED STATES PATENTS

| | | | |
|---|---|---|---|
| 555,131 | 2/1896 | Thomson | 219/150.5 |
| 1,210,029 | 12/1916 | Auel | 219/94 X |
| 1,990,445 | 2/1935 | Younkman | 136/176 |
| 2,180,959 | 11/1936 | Hopkins | 136/134 |
| 2,327,924 | 8/1943 | Mounts | 219/94 |
| 2,653,208 | 9/1953 | Ballman | 219/150.5 |
| 2,672,497 | 3/1954 | Burns | 136/176 X |
| 2,906,804 | 9/1959 | Rigsby, Sr. | 136/134 |
| 2,942,059 | 6/1960 | Doyle et al | 136/176 |

*Primary Examiner*—Donald L. Walton
*Attorney, Agent, or Firm*—Neuman, Williams, Anderson & Olson

EXEMPLARY CLAIM

1. The method of making a storage battery comprising the steps of:
    providing an open top storage battery case having a partition of insulating material which divides the case into at least two separate compartments, said partition having an opening therethrough;
    providing battery elements, said elements each including a connector strap thereon having a connector lug with a sealing face thereon, each connector lug having an integral projection of lead material thereon extending from the sealing face thereon;
    positioning said battery elements in each of said compartments with said projections positioned in contact with each other through the opening in said partition wall, there being an area of reduced cross section at the area of contact;
    passing an electric current through said projections to soften the contact portions of said projections into a deformable mass and cause them to fuse together;
    compressing said connector lugs together when said projections are in a softened state to force the sealing faces of the connector lugs into sealing engagement with opposite sides of the partition wall; and
    maintaining said connector lugs under compression for a period of time sufficient to allow said softened lead material to harden to a point where said sealing faces on said lugs will be permanently maintained in sealing engagement with the partition wall.

14 Claims, 18 Drawing Figures

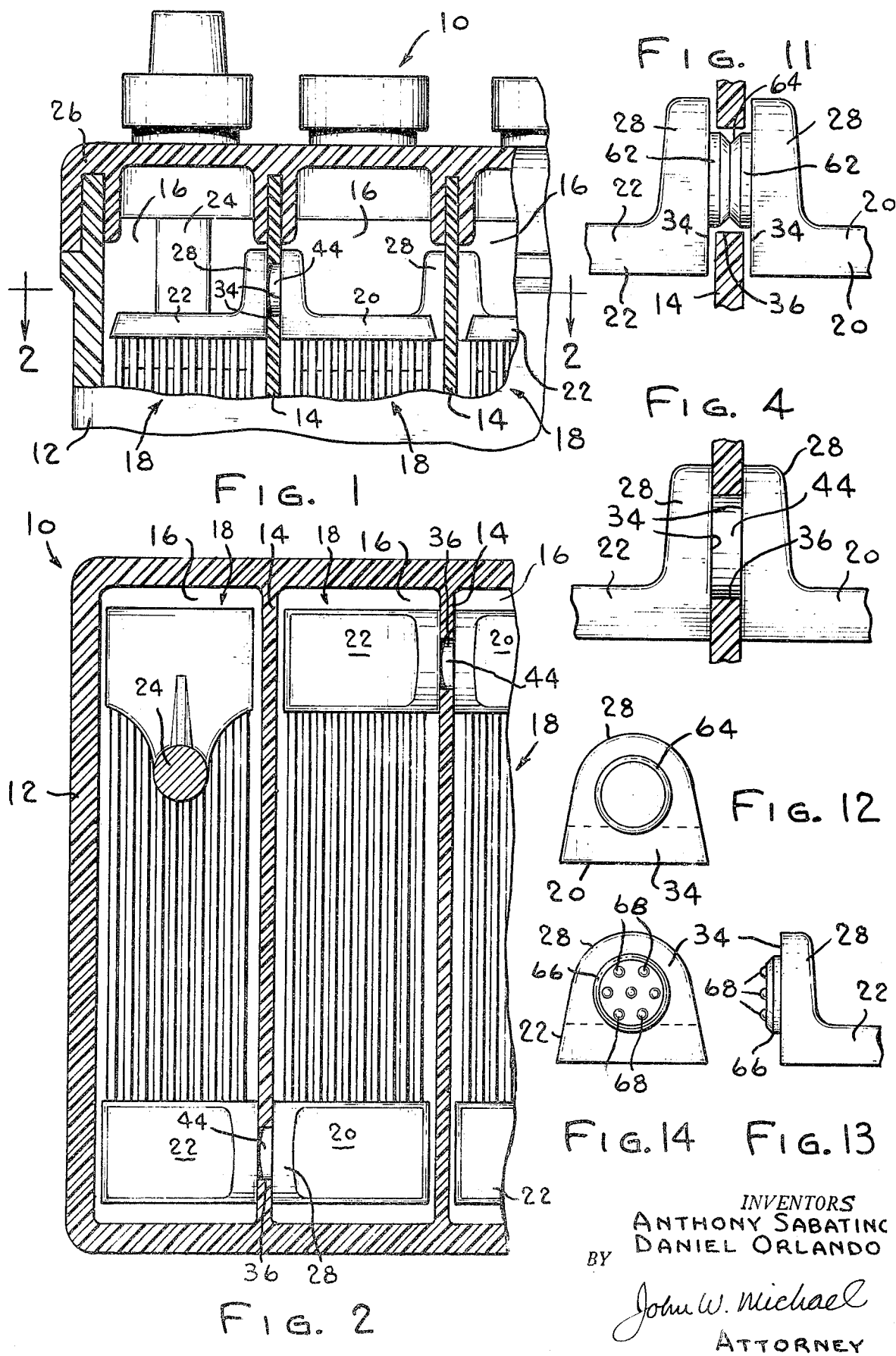

INVENTORS
ANTHONY SABATINO
DANIEL ORLANDO
BY
John W. Michael
ATTORNEY

INVENTORS
ANTHONY SABATINO
DANIEL ORLANDO
BY
John W. Michael
ATTORNEY

STORAGE BATTERY CONSTRUCTION AND METHOD OF MAKING SAME

This invention relates to storage batteries and more particularly to improvements in the construction of intercell electrical connections for multicell batteries and the method of making such intercell connections.

This invention is concerned specifically with intercell connections which are effected within the battery container as opposed to connections made by an external conductor connected to adjacent positive and negative cell posts extending through openings in the battery cover.

Prior connections of the "internal" type have generally been made by (1) inserting a conductor through an aperture in a cell partition, (2) sealing said conductor in the aperture, and (3) then electrically connecting it to the battery straps in the respective cells.

It is the principal object of this invention to provide an intercell connection which not only has superior mechanical and electrical characteristics but can be made by a fewer number of easily performed steps.

Another object is to provide a method which is particularly well adapted to machine operation to further reduce fabrication time and expense.

A further object is to provide an intercell connection of comparatively low electrical resistance, high mechanical strength, and which is tightly sealed in the aperture and to the partition wall to prevent leakage of electrolyte between adjacent cells.

The objects of this invention are attained by providing an open top storage battery case having a partition which divides the case into at least two separate compartments, said partition having an aperture. Battery elements are positioned in each of the battery compartments which include a strap having a connector lug thereon precast to the elements. Each lug has a sealing face thereon provided with an area adapted for interconnection through said aperture. The elements are positioned in the compartments so that the area on one connector lug is in contact, directly or indirectly (by an intermediate member), with the area on the connector lug in the adjacent compartment through the aperture. These areas are joined by a pressurized resistance weld and the aperture is completely and tightly filled with the lug material to form a seal preventing leakage of electrolyte between cells.

The method of welding adjacent areas to each other and sealing the welded portion in the partition aperture is comprised broadly of three stages termed for purposes of explanation the "squeeze", "weld" and "hold" stages. During the first or squeeze stage the connector lugs are squeezed together to accurately align the areas and to insure the application of a predetermined amount of contact pressure between the areas prior to the passage of electric current therethrough.

The next stage is the weld stage during which period an electric welding current is passed through the direct or indirect connected areas to produce heat for welding the two lugs together. During the weld stage the pressure applied at the areas is maintained to force the molten metal into sealing engagement with the wall of the aperture and to force the sealing faces on the connector lugs into sealing engagement with opposite sides of the partition wall.

The third and final stage is the hold stage during which time the pressure at the connector lugs is maintained and the weld area is cooled to produce a sound weld and a tight seal.

Other objects and advantages will be pointed out in, or be apparent from the specification and claims, as will obvious modifications of the several embodiments shown in the drawings, in which:

FIG. 1 is a side elevation view of a completely assembled storage battery with part of the casing broken away to show the internal construction of an intercell connection made in accordance with the present invention;

FIG. 2 is a fragmentary sectional view taken along line 2—2 of FIG. 1;

FIGS. 3 and 4 are fragmentary side elevation views showing the parts before and after the intercell connection is made;

FIG. 11 is a fragmentary side elevation view of another modified form of connector lugs;

FIG. 12 is an end elevation view of one of the modified connector lugs shown in FIG. 11;

FIGS. 13 and 14 are side and end elevation views of another modified form of connector lug;

Figure 3:
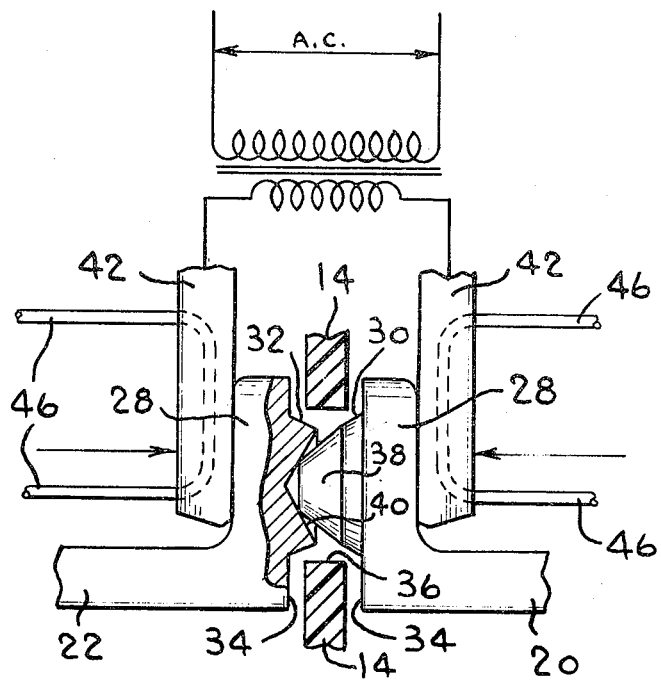
Figure 7:
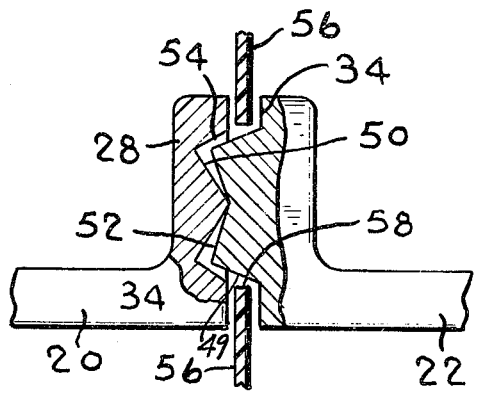
FIGS. 7 and 8 are fragmentary side elevation views showing a modified set of connector lugs and projections before and after the connection is made.
Figure 8:
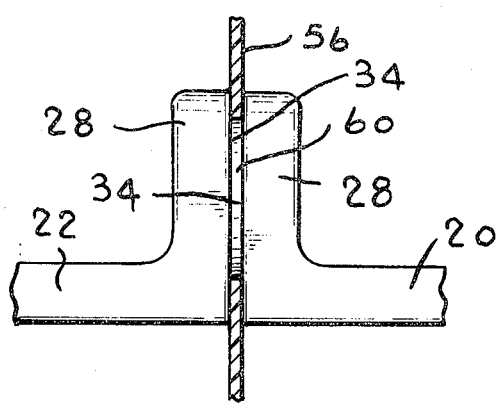

Referring to the drawings in detail, FIGS. 1 and 2 show a battery 10 comprising a casing 12 having a plurality of partition walls 14 molded integrally with the casing 12 to form cell chambers 16. A battery element 18 is mounted in each chamber 16. Elements 18 are of conventional design and include positive and negative plates alternately arranged with suitable separators with straps 20 and 22 of opposite polarity cast to the respective positive and negative plates of each element. The elements in the end cell chambers are provided with terminal posts 24 (one shown) which extend upwardly through battery cover 26 for external electrical connection in the circuit in which the battery is to be used.

Figure 5:
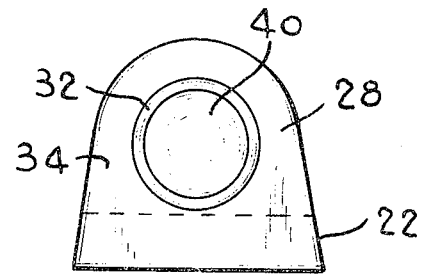
FIGS. 5 and 6 are end elevation views of the connector lugs and projections shown in FIG. 3.
Figure 6:
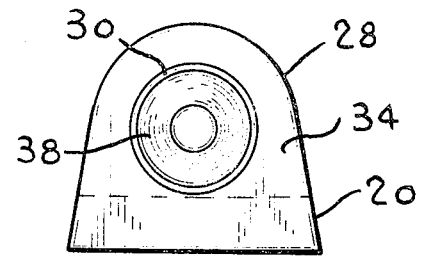
Figure 9:
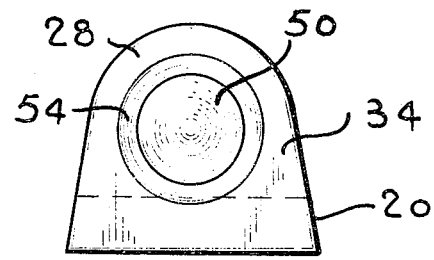
FIGS. 9 and 10 are end elevation views of the connector lugs shown in FIG. 7.
Figure 10:
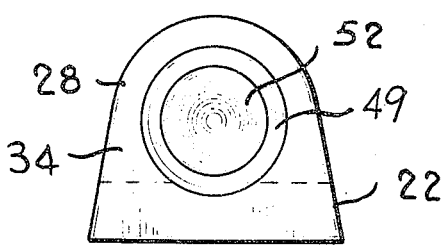

Referring now to the preferred embodiment of the invention shown in FIGS. 3, 5 and 6, straps 20 and 22 (other than those having a terminal post 24 thereon) are provided with an upstanding connector lug 28 having projections 30 and 32 extending horizontally from a flat sealing face 34 thereon. The connector lugs and projections are cast integrally with straps 20, 22 and are preferably of lead. The straps are cast to the plates of the elements by any suitable method and apparatus such as that described generally in copending applications Ser. Nos. 79,728 and 813,865 (now U.S. Pat. No. 3,087,005) assigned to the assignee of this application.

Elements 18 are installed in cell chambers 16 by any suitable means with projections 30 and 32 on connector lugs 28 aligned with apertures 36 in the partition walls. Apertures 36 are made in walls 14 by any suitable means such as punching prior to installation of the elements in the casing.

After elements 18 have been installed in the casing 12 and properly positioned in the cell chambers, projections 30 and 32 will assume the position shown in FIG. 3. The parts are now ready for completion of the intercell connection between a negative strap of one element with a positive strap of the next adjacent element.

While the particular configuration of the projections can take many forms, the preferred configuration is shown in FIG. 3 wherein projection 30 is provided with a conical nose 38 which registers with a conical depression 40 in projection 32. The tip of nose 38 has been cut off as shown to facilitate installation of the element in the cell chamber. It will be noted that the included angle of depression 40 is greater than that of nose 38. The significance of this construction will be explained in detail hereinafter.

Figure 15:
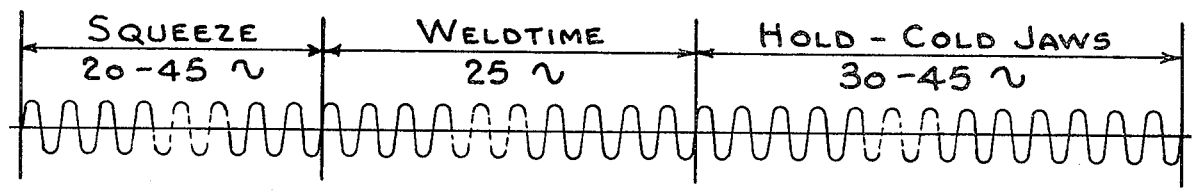
FIG. 15 is a diagram showing the three stages which comprise the method of this invention.

The method of making the intercell connection is comprised broadly of three stages termed, for purposes of explanation, the squeeze, weld and hold stages which are shown diagrammatically in FIG. 15.

During the first or squeeze stage, projections 30 and 32 are squeezed together by any suitable means such as a pair of power actuated jaws 42, as shown in FIG. 3.

This initial squeeze period serves several important purposes. First it serves to accurately align projections 30, 32 by forcing nose 38 into engagement with depression 40. Secondly, it provides a short dwell time to permit stabilization of the power cylinder (not shown) used to close jaws 42 to thus eliminate the effect of any "bounce" at the jaws as the actuating cylinder is energized to apply pressure at the projections. Third and most important is that the squeeze period insures the application of a predetermined amount of pressure at the projections prior to the passage of electric current through the projections during the subsequent weld stage presently to be described. As will be explained, the heat produced by such current will vary with the resistance at the area of contact which, in turn, will vary with the pressure at the contact area. Thus, by controlling the pressure at the contact area it is possible to exercise some control over the heat produced during the weld stage.

In the preferred embodiment, the duration of the squeeze time is from 20 to 45 cycles (1 cycle=1/60 sec.) and the pressure applied by jaws 42 is about 600 pounds.

The next stage is the weld stage during which period an electric current is passed through projections 30, 32 to produce heat for welding the two parts together. During this period there are variations in the heat energy produced, the physical upset of the parts, the electrical resistance at the contact area, and the pressure at the contact area. Such variations are shown diagrammatically in FIG. 16.

As previously stated, it is important that the amount of heat energy produced be controlled as accurately as possible. It is also important to build up to the desired level of heat energy very rapidly once the weld stage begins. This is accomplished by designing projections 30, 32 so as to produce a high initial resistance at the contact area which in turn will produce a rapid build-up of heat when a welding current is applied. Such high initial resistance is produced by providing a relatively small initial contact area between projections 30 and 32. As shown in FIG. 3, the included angle of tip 38 on projection 30 is less than the included angle of depression 40 in projection 32. In the preferred embodiment these angles are 80 and 120 degrees, respectively. By making the two angles different it will be seen that there will be only a line contact between the two parts prior to welding to thus provide a high initial resistance to the welding current.

Figure 16:
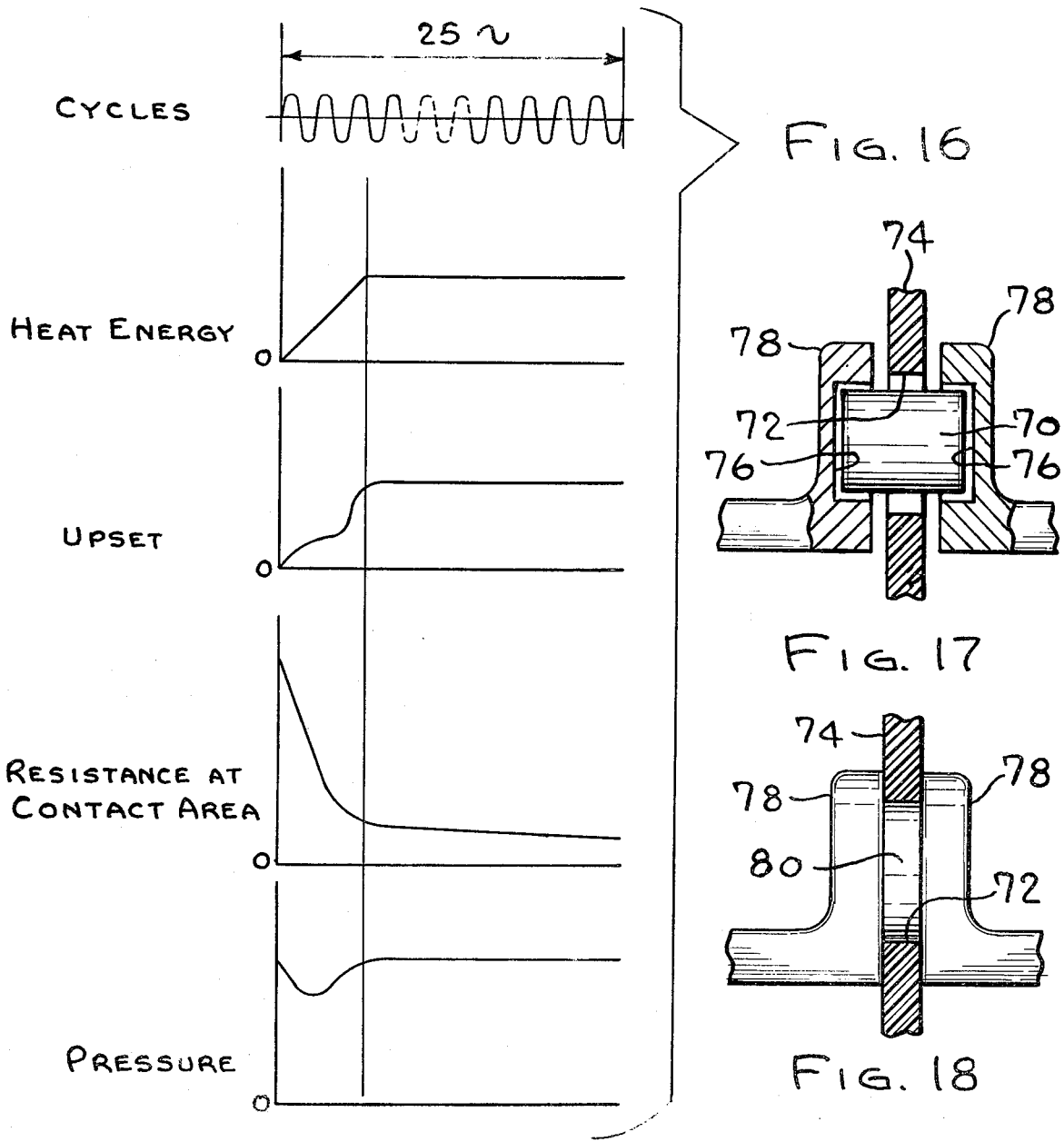
FIG. 16 is a more detailed diagrammatic breakdown of the weld stage of the method.

As shown in FIG. 16, when current is applied to jaws 42 the heat energy at the projections will build up very rapidly to a maximum point in about 1 to 1½ cycles. During this initial build-up of heat energy, the lead projections will soften and be upset from the position and configuration shown in FIG. 3 to that shown in FIG. 4. As the projections fuse and flow together under pressure, the area of contact will increase rapidly to thereby reduce the resistance which, in turn, will stabilize the heat energy produced and thus prevent a "blow-out" of the weld due to excessive heat. A thoroughly fused connector portion 44 is produced as shown in FIG. 4.

As shown in FIG. 16, the total physical upset of the parts occurs during the first few cycles of the weld stage and a rapid drop in electrical resistance also occurs during these first few cycles. It is noted that the pressure at the projections will drop off slightly as the lugs are pressed together. The pressure then returns to its initial level after upset is complete and the faces 34 on lugs 28 are pressed into contact with partition wall 14.

In the preferred embodiment of the method the weld stage lasts for about 25 cycles during which time approximately 25,000 watt/seconds of energy is supplied to the projections. The electrical energy is provided by 6-volt A.C. which averages about 10,000 amps during the weld stage. The energy supplied during the weld stage is supplied at either a constant or varying rate depending primarily on the particular configuration of the projections.

The third and final stage is the hold stage during which time the pressure at the lugs 28 is maintained and the weld area is cooled to produce a sound weld at the connector portion 44 (FIG. 4). In the preferred embodiment the hold stage continues for about 30 to 45 cycles during which time the 600 pound force is maintained by jaws 42. Cooling is accomplished by any suitable means such as by circulating water or other medium at about 40°F. through jaws 42 by any suitable means such as conduits 46 as shown in FIG. 3.

The completed connection 44 provides a double seal between adjacent cell chambers 16. By virtue of the pressure applied to the lugs during the welding operation, faces 34 on lugs 28 will be forced into and held in sealing engagement with opposite sides of partition walls 14 upon completion of the weld.

A second seal is produced between connector portions 44 and the walls of apertures 36. Projections 30, 32 are designed so that the total volume thereof is about 3–12% greater than the volume of apertures 36 in the partition walls. Thus, as the projections are fused together in the aperture under pressure the lead will be forced into sealing engagement with the aperture walls which tends to enlarge the apertures slightly. Not only is a tight mechanical seal created in this area but due to the heat present there appears to be a further chemical bond created by carbonization of the battery case when made of a rubber base material with plastic binders.

Referring now to the several modifications of the invention shown in FIGS. 7–14 and 17–18, FIGS. 7, 8, 9 and 10 show a first modification designed specifically for use with a thin-walled battery case of the type employing a hydrocarbon polymer plastic in which the walls are not in excess of 0.100 inches. It is noted, however, that this modification could be used with the standard heavy wall battery case as well. This modification is similar to the preferred embodiment shown in FIG. 3 in that it includes a lug 28 having a projection 49 with a depression 52 therein which registers with a conical point 50 on the other lug 28. Conical point 50 is recessed in the face of the connector lug as at 54 to receive projection 49 and thereby provide a confined area for the molten metal to compensate for the thin-walled partition 56 having an aperture 58 which provides a comparatively small enclosure for the fused metal. The parts are welded to produce a sealed connector portion 60 (FIG. 8) by the same general steps outlined above with some variation in the details relating to cycles per stage, watt/seconds of energy applied, etc.

The modifications shown in FIGS. 11-13 are included to show a few of the many different types of projections which could be employed. FIGS. 11 and 12 show a projection 62 having a chamfer 64 which provides a relatively large initial contact area making it desirable to provide some outside means to control the amount of watt/seconds of energy used during the weld stage. As explained previously, with the preferred embodiment shown in FIG. 3 such control is more or less built-in due to the particular configuration of the projections.

FIGS. 13 and 14 show another modification similar to that shown in FIG. 11 which comprises a projection 66 having bumped-up portions 68 thereon to reduce the initial contact area between the two parts.

Figure 17:
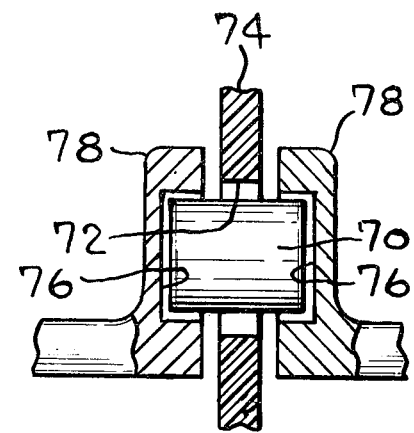
FIGS. 17 and 18 are side elevation views of another modification before and after welding.
Figure 18:
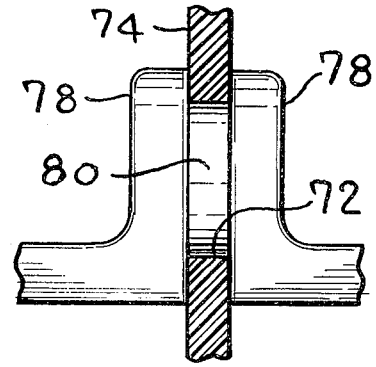

Finally, FIGS. 17 and 18 show another modification which includes an intermediate insert member 70 fitted in an aperture 72 in partition wall 74. Member 70 may be of any suitable cross-sectional shape (round, square, etc.) with its ends seated in recesses 76 in connector lugs 78 as shown in FIG. 17. The parts are welded together in a single welding operation to produce a connector portion 80 (FIG. 18) by the same general steps outlined above. Connector portion 80 is in sealing engagement with the wall of aperture 72 and serves to hold lugs 78 in sealing engagement with opposite sides of partition wall 74 in the same manner as connector portion 44 (FIG. 4) described above.

It may not be necessary that the projections on the straps be integral or that each strap have a projection. The essential thing is that each strap have an area which is electrically connected through the aperture by enough metal and proper size areas of contact so that the welding current will melt the metal and cause it to fuse the straps and rigidly seal the aperture.

It will be appreciated that all three stages of the above described method can be performed by relatively simple apparatus well adapted for mass production welding manufacturing techniques. The squeeze, weld and hold steps can all be performed by a single set of power jaws in what amounts to a single mechanical operation. Since the lugs and projections thereon are all cast integrally with the straps prior to insertion of the elements in the case, the intercell connection is completed by a single operation performed by jaws 42. It will be appreciated that by incorporating a plurality of jaws into a piece of automatic machinery all the intercell connections for an entire battery can be made simultaneously in a matter of a few seconds.

Although several embodiments of the present invention have been illustrated and described, it will be apparent to those skilled in the art that various changes and modifications may be made therein without departing from the spirit of the invention or from the scope of the appended claims.

We claim:

1. The method of making a storage battery comprising the steps of:

providing an open top storage battery case having a partition of insulating material which divides the case into at least two separate compartments, said partition having an opening therethrough;

providing battery elements, said elements each including a connector strap thereon having a connector lug with a sealing face thereon, each connector lug having an integral projection of lead material thereon extending from the sealing face thereon;

positioning said battery elements in each of said compartments with said projections positioned in contact with each other through the opening in said partition wall, there being an area of reduced cross section at the area of contact;

passing an electric current through said projections to soften the contact portions of said projections into a deformable mass and cause them to fuse together;

compressing said connector lugs together when said projections are in a softened state to force the sealing faces of the connector lugs into sealing engagement with opposite sides of the partition wall; and maintaining said connector lugs under compression for a period of time sufficient to allow said softened lead material to harden to a point where said sealing faces on said lugs will be permanently maintained in sealing engagement with the partition wall.

2. A method for making a storage battery comprising the steps of:

providing an open top storage battery case having a partition therein of insulating material which divides the case into at least two separate compartments, said partition having an aperture therethrough;

positioning battery elements in each of said compartments, said elements each including a connector strap thereon, said connector straps each having a connector lug with a sealing face, an integral projection of lead material on each sealing face in contact with each other through the partition aperture;

passing an electric welding current through said projections; and squeezing said connector lugs together during and immediately subsequent to the application of the electric welding current to force the molten lead of the weld area into sealing engagement with the wall of the aperture, to force the sealing faces of the connector lugs into sealing engagement with opposite sides of the partition wall, and to weld said lugs together and maintain said sealing engagements.

3. The method according to claim 2 and wherein the volume of said projections is slightly greater than the volume of said aperture.

4. The method of making a storage battery comprising the steps of:

providing an open top storage battery case having a partition therein of insulating material which divides the case into at least two separate compartments, said partition having an opening therethrough;

providing battery elements, said elements each including a connector strap thereon and said connector straps each having a connector lug with a sealing face thereon, there being lead projection material extending from said sealing faces for electrically connecting said straps;

positioning one of said battery elements in each of said compartments with said projection material extending through the partition opening between said lugs;

passing an electric welding current through said projection material to soften such material into a deformable mass; and squeezing said connector lugs together during the application of the electric current to force the softened projection material into sealing engagement with the wall of the partition opening, said squeezing being effective to force the sealing faces of the connector lugs into sealing engagement with opposite sides of the partition wall.

5. The method of making a sealed electrical connection through an aperture in a wall of a storage battery comprising the steps of:

providing a metal conductor at each end of said aperture, each of said conductors having a lead projection formed thereon and projecting therefrom;

positioning said conductors with said projections in contact with each other through said aperture;

passing an electric welding current through said projections to soften said projections into a deformable mass; and pressing said conductors together during the application of the electric welding current to weld said projections together and to force the softened lead into sealing engagement with the partition aperture.

6. In a method for making a fluid tight, low resistance electrical connection through the dividing wall between two independent cell compartments of an electric storage battery, the steps comprising; providing a hole through the dividing wall between two independent cell compartments, providing opposed connector elements having tapered shanks and non-mating end portions wherein the diameter of said shanks permits entry of the shanks into said hole, entering said tapered shanks into said hole from opposite sides of said dividing wall so that the non-mating end portions thereof contact one another, applying force simultaneously from opposed directions to said shanks for causing said non-mating ends to contact one another, passing a welding current through the junction of the opposite ends of said shanks sufficient to cause resistance welding of said shanks one to another for forming a unitary electrical connection therebetween and substantially simultaneously causing said tapered shanks to seal against the walls of said hole and to distort within the hole for filling same and to deform for forming an additional seal against opposite sides of the wall by maintaining said force application, eliminating said welding current and maintaining said force application at opposite ends of said shanks until the welded connection therebetween has cooled sufficiently to maintain the fluid tight seal with said wall.

7. In a method for making a fluid tight, low resistance electrical connection through a hole in the dividing wall between two independent cell compartments of an electric storage battery, the steps comprising; positioning a two part connector element on opposite sides of said hole means on each of said connector element parts to permit its entry into said hole, positioning first portions of each of said connector element parts in said hole in abutting relationship applying force from opposite ends of said connector element while heating the same by means of a welding current for causing softening of said connector element and welding of the parts of said element while distorting the same sufficiently to fill tightly the hole with said connector material and to cause second portions on said connector to seal against opposite sides of said wall, and then de-activating the welding current while maintaining said application of force until the welded connector has cooled sufficiently to maintain the fluid tight seal with said wall.

8. In a method for making a fluid tight, low resistance electrical connection through the dividing wall between two independent cell compartments of an electric storage battery, the steps comprising; providing a hole through the dividing wall between two independent cell compartments, providing opposed connector elements having tapered shanks and non-mating end portions wherein the diameter of said shanks permits entry of the shanks into said hole, entering said tapered shanks into said hole from opposite sides of said dividing wall so that the non-mating end portions thereof contact one another, applying force simultaneously from opposed directions to said shanks for causing said non-mating ends to contact one another, passing a welding current through the junction of the opposite ends of said shanks sufficient to cause resistance welding of said shanks one to another for forming a unitary electrical connection therebetween and substantially simultaneously causing said tapered shanks to seal against the walls of said hole and to distort within the hole for filling same and to deform for forming an additional seal at opposite sides of the wall by maintaining said force application, eliminating said welding current and maintaining said force application at opposite ends of said shanks until the welded connection therebetween has cooled sufficiently to maintain the fluid tight seal with said wall.

9. In a method for making a fluid tight, low resistance electrical connection through the dividing wall between respective battery elements disposed in two independent cell compartments of an electric storage battery, the steps comprising: providing a hole through the dividing wall between two independent cell compartments, providing opposed connector elements having upstanding opposed lug members on each side of said dividing wall each connected to the battery element in its respective cell compartment, providing on said lug members shaped projection portions to permit entry into said hole, positioning said parts of said projection portions in said hole from opposite sides of said dividing wall so that the opposed ends of said projection portions contact one another, applying force simultaneously from opposed directions to said lug members for causing said projection portions to contact one another, passing a welding current through the junction of the opposite ends of said projection portions sufficient to cause resistance welding of said projection portions one to another for forming a unitary electrical connection therebetween and substantially simultaneously causing said projection portions to seal against the walls of said hole to distort within the hole for filling same and to deform for forming an additional seal against the opposite sides of the wall by maintaining said force application, eliminating said welding current and maintaining said force application on said lug members until the welded connection between the projection portions has cooled sufficiently to maintain the fluid tight seal.

10. The method of claim 9 further comprising: providing said opposite projection portions with non-mating configurations, and limiting the entry of said projection portions into said hole by abutting said ends within said hole.

11. The method of claim 9 further comprising: limiting the entry of said connector elements by abutting said lug members against said dividing wall; and, distorting with said welding current portions of said connector elements adjacent said hole to form an additional seal against the opposite sides of said dividing wall.

12. In a method for making a fluid-tight, low resistance electrical connection through a hole in the dividing wall between respective battery elements in two independent cell compartments of an electric storage battery, the steps comprising: providing connector elements having opposed lug members on either side of said dividing wall each connected to the battery element in its respective cell compartment, providing a connector portion on each of said lug members and positioning said connector portion adjacent said hole from opposite sides thereof, positioning each of said connector portions so as to permit entry into said hole, entering said connector portions into said hole so that said connector portions contact one another within said hole, applying force to said connector elements while heating the same by means of a welding current for causing softening of said connector portions and welding of said connector elements while distorting the same sufficiently to fill tightly said hole with said connector element material and to cause portions of said lug members to seal against opposite sides of said wall, and then de-activating the welding current while maintaining said application of force until the welded connector has cooled sufficiently to maintain the fluid tight seal.

13. The method of claim 12 further comprising: forming said connector portions as integral projections with extremities thereof extending toward each other from said lug members.

14. The method of claim 13 further comprising: forming non-mating configurations on the opposed extremities of said connector portions; and limiting the entry of said connector portions into said holes by abutting said non-mating end portions within said hole.

* * * * *